Dec. 30, 1924.

C. A. HUNTER 1,520,950

FLOOR BOARD SHIELD FOR AUTOMOBILES

Filed June 7, 1922

Inventor:
Charles A. Hunter
By Gillson + Gillson
Attys.

Patented Dec. 30, 1924.

1,520,950

UNITED STATES PATENT OFFICE.

CHARLES A. HUNTER, OF AURORA, ILLINOIS.

FLOOR-BOARD SHIELD FOR AUTOMOBILES.

Application filed June 7, 1922. Serial No. 566,549.

*To all whom it may concern:*

Be it known that I, CHARLES A. HUNTER, a citizen of the United States, and resident of Aurora, county of Kane, and State of Illinois, have invented certain new and useful Improvements in Floor-Board Shields for Automobiles, of which the following is a specification, and which are illustrated in the accompanying drawings, forming a part thereof.

The invention relates to automobiles and has for its object to increase the comfort of riding and driving by preventing contact with the floor boards of the car of heated air passing from the motor or cold air passing through the hood in severe weather. To this end the invention contemplates a heat deflecting shield of special form adapted to be supported under the floor boards of the car in an improved manner.

In the accompanying drawings—

Figure 1:
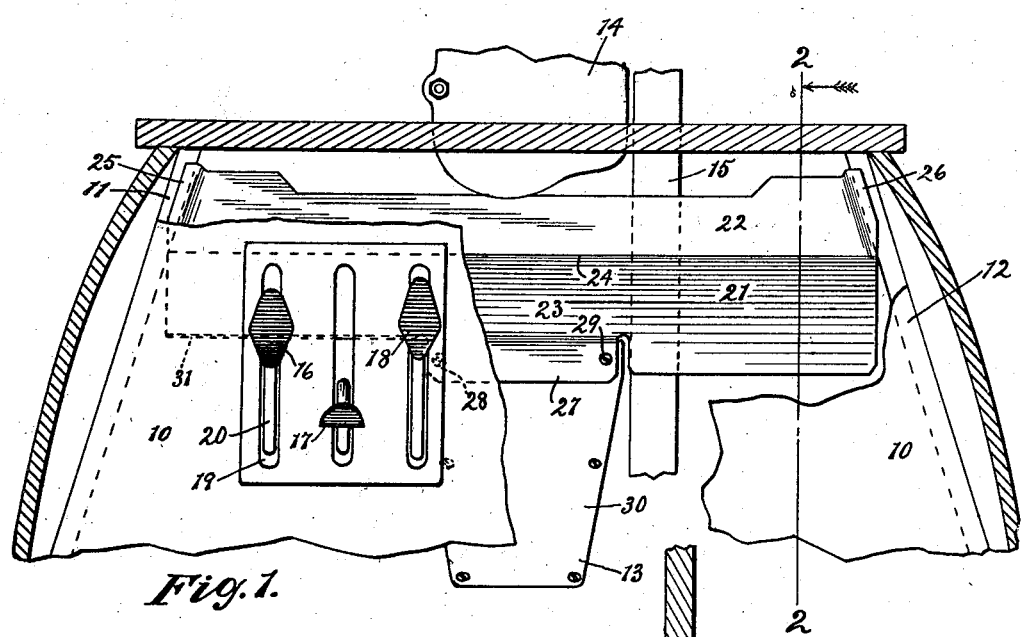
Figure 2:
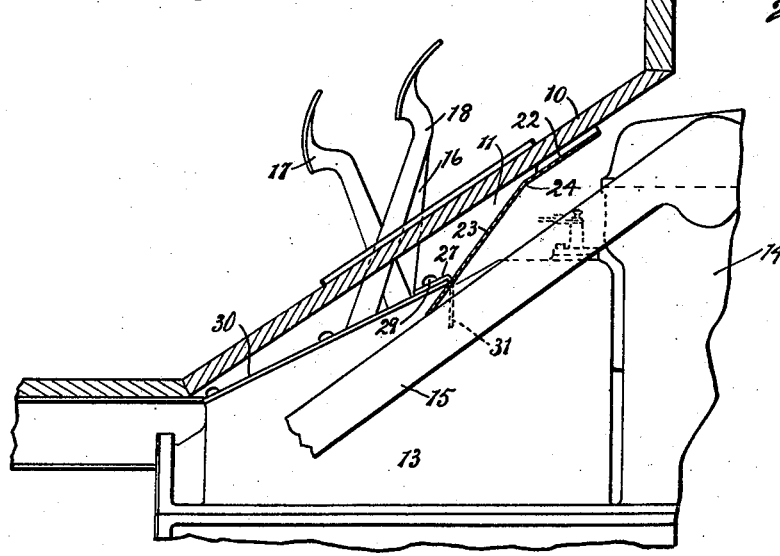

Fig. 1 is a detail plan view of an automobile with the improved heat deflector applied thereto, the hood, the side walls of the body and some of the floor boards being omitted, and Fig. 2 is a detail sectional view taken on the line 2—2 of Fig. 1.

In the particular type of automobile to which the improvement provided by the invention is especially applicable, the floor boards 10 rest upon a pair of upwardly inclined forwardly converging supplemental frame members 11, 12. The transmission case 13 is located under the floor boards 10 centrally between the more widely separated portions of the frame members 11, 12; the motor 14 being in front of the transmission case 13 and the exhaust pipe 15 extending downwardly and rearwardly at one side of the transmission case substantially parallel with the plane of the underside of the floor boards. At the remote side of the transmission case 13 from the exhaust pipe 15 are the several operating pedals, as 16, 17, 18. These pedals are arranged in a transverse row and the floor boards 10 are formed with openings, as 19, to pass the pedal arms, as 20.

In carrying out the invention the underside of the floor boards 10, particularly that part of the same upon which the feet of the occupants rest, and the openings 19 are shielded to prevent overheating of the boards and the passage of heated or excessively cold air through the openings. As shown, a sheet metal plate generally designated 21 is employed. This plate is substantially of rectangular form and of a length only slightly less than the length of the floor board 10 resting upon the higher end portions of the frame members 11 and 12. When in place upon the car the forward portion 22 of the plate is parallel with the underside of the floor boards 10 and its rearward portion 23 slopes downwardly away from the same. For this purpose the body of the plate is bent upon a transverse line 24 extending throughout the entire length of the plate intermediate its front and rear edges.

To prevent excessive vibration of the plate 21 it is desirably supported at both its front and rear edges. When used in the form shown, the frame members 11, 12, provide convenient supports for the two front corners 25, 26, of the plate and the transmission case 13 provides a support for an intermediate portion 27 of the plate at its rear edge. In order that the forward portion 22 of the plate will not be brought into direct contact with the underside of the adjacent floor board 10 by the resting of the corners 25, 26, of the plate upon the frame members 11, 12, the plate is upwardly offset at its said two corners forming ears or ledges for engagement with the frame members. As the two corners 25, 26, of the plate are applied to the frame members 11, 12, under the corresponding floor board, the overlying floor board serves to firmly bind them in place. The rear marginal portion 27 of the plate, on the other hand, is firmly held in place by being secured to the transmission case 13 with some of the same screws, as 28, 29, which are employed for holding the cover plate 30 of the transmission case.

The downward inclination of the rearward portion 23 of the plate 21 serves to deflect air currents passing under the floor boards 10 downwardly away from the said boards. Furthermore, at one side of the transmission case 13 the plate 21 is interposed between the motor exhaust conduit 15 and the underside of the floor boards 10, throughout the full width of the plate. At the other side of the transmission case 13, air currents passing under the floor boards 10 are more effectively deflected away from the pedal openings 19 by forming the corresponding part of the plate with a depending flange 31 which extends along the rear margin of the plate in position to clear the pedal, as 16, 17, 18. Owing to the converging arrangement of the frame members 11, 12, the rearward portion 23 of the plate and its depending flange 31 are permitted to hang between the frame members, while the upper front corners of the plate rest upon and are supported by the frame members.

I claim as my invention:

1. The combination with the upwardly inclined converging body frame members of an automobile, the transmission case and its removable cover plate located between and below the more widely separated portions of the said frame members, and floor boards resting upon and extending between the said frame members over the transmission case, of a sheet metal shield having upwardly offset ears at its two front corners each resting upon one of the frame members near the higher end of the same and being bound thereto by the overlying floor board, all other parts of the shield being spaced apart from the underside of the floor boards, and clamping screws binding the transmission case cover and the intermediate rear marginal portion of the shield to the transmission case.

2. The combination with the upwardly inclined converging body frame members of an automobile, the transmission case and its removable cover plate located between and below the more widely separated portions of the said frame members, and floor boards resting upon and extending between the said frame members over the transmission case, one of the floor boards having a transverse row of openings at one side of the transmission case for the passage of the controlling pedals, of a sheet metal shield having upwardly offset ears at its two front corners each resting upon one of the frame members near the higher end of the same and being bound thereto by the overlying floor board, all other parts of the shield being spaced apart from the underside of the floor boards, clamping screws binding the transmission case cover and the intermediate rear marginal portion of the shield to the transmission case and a flange depending from the rear margin of the shield at one side of the transmission case transversely in front of the plane of the front edges of the said pedal openings in the floor boards.

3. The combination with the upwardly inclined converging body frame members of an automobile, the transmission case and its removable cover plate located between and below the more widely separated portions of the said frame members, and floor boards resting upon and extending between the said frame members over the transmission case, of a sheet metal shield having each of its two front corners resting upon one of the frame members near the higher end of the same and being bound thereto by the overlying floor board, and clamping screws binding the transmission case cover and the intermediate rear marginal portion of the shield to the transmission case.

4. The combination with the upwardly inclined converging body frame members of an automobile, the transmission case and its removable cover plate located between and below the more widely separated portions of the said frame members, and floor boards resting upon and extending between the said frame members over the transmission case, one of the floor boards having a transverse row of openings at one side of the transmission case for the passage of the controlling pedals, of a sheet metal shield having each of its two front corners resting upon one of the frame members near the higher end of the same and being bound thereto by the overlying floor board, clamping screws binding the transmission case cover and the intermediate rear marginal portion of the shield to the transmission case and a flange depending from the rear margin of the shield at one side of the transmission case transversely in front of the plane of the front edges of the said pedal openings in the floor boards.

5. In an automobile, longitudinally extending frame members, floor boards secured on said frame members, said floor boards being provided with openings through which control levers are adapted to extend, and a shield for said openings, said shield comprising a single sheet of material secured at its forward portion forwardly of said openings and extending rearwardly and downwardly beneath the same to deflect the air from the engine to prevent the same from entering said openings, and means for rigidly securing the lower portion of said shield to prevent vibration of the same.

CHARLES A. HUNTER.